United States Patent
Klumb

[15] 3,669,834
[45] June 13, 1972

[54] CORE PLUG FOR NUCLEAR REACTOR AND METHOD OF OPERATING REACTOR

[72] Inventor: Ralph H. Klumb, Simsbury, Conn.
[73] Assignee: Combustion Engineering, Inc., Windsor, Conn.
[22] Filed: Oct. 29, 1968
[21] Appl. No.: 771,443

[52] U.S. Cl.....................176/87, 176/72, 176/76, 176/30
[51] Int. Cl.........................................E21b 21/04
[58] Field of Search......................176/21, 29, 38, 79, 87, 76, 176/83, 72

[56] References Cited

UNITED STATES PATENTS

| | | | |
|---|---|---|---|
| 3,022,240 | 2/1962 | Bassett | 176/72 X |
| 3,087,879 | 4/1963 | Walker et al. | 176/79 |
| 3,291,698 | 12/1966 | Fortescue | 176/72 X |
| 3,335,064 | 8/1967 | Whittaker et al. | 176/76 X |
| 3,368,946 | 2/1968 | Jenssen | 176/83 X |
| 3,384,551 | 5/1968 | Kornbichler | 176/54 X |

Primary Examiner—Carl D. Quarforth
Assistant Examiner—S. R. Hellman
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

A core plug for replacing a fuel assembly of a reactor with the plug being devoid of nuclear fuel and having a high flow resistance such as to permit only sufficient coolant flow through it for adequately cooling the plug. In the operation of the reactor, should a fuel assembly within the central region of the core become defective, this defective assembly will be removed and there will be a reshuffling of the fuel assemblies so as to produce an open assembly space at the outermost core region. There will then be placed in this space a core plug having the aforementioned flow characteristics.

7 Claims, 7 Drawing Figures

INVENTOR.
RALPH H. KLUMB

BY

*Eldon H. Luther*
ATTORNEY

INVENTOR.
RALPH H. KLUMB

CORE PLUG FOR NUCLEAR REACTOR AND METHOD OF OPERATING REACTOR

BACKGROUND OF THE INVENTION

Nuclear reactors of the type to which the instant invention pertains have a core that is made up of fuel assemblies that are individually removable. Each of these assemblies is, in turn, comprised of numerous spaced fuel elements over which the coolant of the reactor is conveyed. It happens that during the operation of the reactor a fuel element may become defective. If the assembly within which this element is contained is not removed from the reactor, the coolant becomes increasingly contaminated with fission products. Accordingly, it is highly desirable to remove such defective assembly from the core. If the assembly is to be replaced by a similar assembly, it is of course necessary that such additional assembly be kept in reserve, and therefore the necessity would arise to keep a number of the assemblies in storage in order to have the capability of replacing defective assemblies as they occur. This entails considerable expense since the assemblies themselves are expensive and while in storage they are providing no useful function.

SUMMARY OF THE INVENTION

In accordance with the present invention, in lieu of replacing a defective assembly with a similar fuel assembly in good working order, the defective assembly is replaced by means of a plug which contains no nuclear fuel, i.e., fissionable material, at all. It is merely a metallic assembly which will have a high resistance to flow through it and which will be as economic as possible to provide the desired results. It is necessary to insert such a plug since otherwise the removal of a defective assembly would provide a relatively free flow path through the reactor core such that substantial amounts of fluid would, in effect, bypass the core fuel elements and undesirably upset flow distribution. The flow resistance of the plug is greater than that of a fuel assembly and is preferably as high as practical while still permitting adequate cooling. Thus the plug is not only effective to prevent fluid bypassing the core through an open fuel assembly space but is also effective to provide a minimal flow through the plug and thereby somewhat increase the flow through the remaining core portion over what it would otherwise be.

In the present invention this plug is comprised of a plurality of opposed wall members secured to an end fitting at the lower end of the assembly and being free to expand longitudinally relative to each other from the end fitting. A central support member is provided within the wall members and engages the lower end fitting. The upper end fitting of the plug is effectively secured to this support member with a precompressed spring being interposed intermediate this upper end fitting and the upper end of the support member. The lower and upper ends of the plug are provided with openings so as to provide the aforementioned restricted flow of cooling fluid through the plug during operation of the reactor so that the metallic portions of the plug are adequately cooled.

In the operation of the reactor when the defective fuel assembly is located in the extreme outer region of the core, adjacent the core shroud, the assembly is removed and a core plug is inserted in place of the assembly. However, when the defective fuel assembly is located within the interior of the core, this assembly is replaced by an assembly at the outermost region of the core; and then this assembly is, in turn, replaced by the plug. The reason for this is that the plug is fabricated of stainless steel; and if it were inserted within the inner region of the core, it would act as an undesirable flux depressant and thus have an adverse effect on power output of the core. On the other hand if the plug is inserted at the outermost region of the core, it acts similar to the core shroud and has a much lesser effect upon power output.

DETAILED DESCRIPTION OF THE INVENTION

Figure 3:
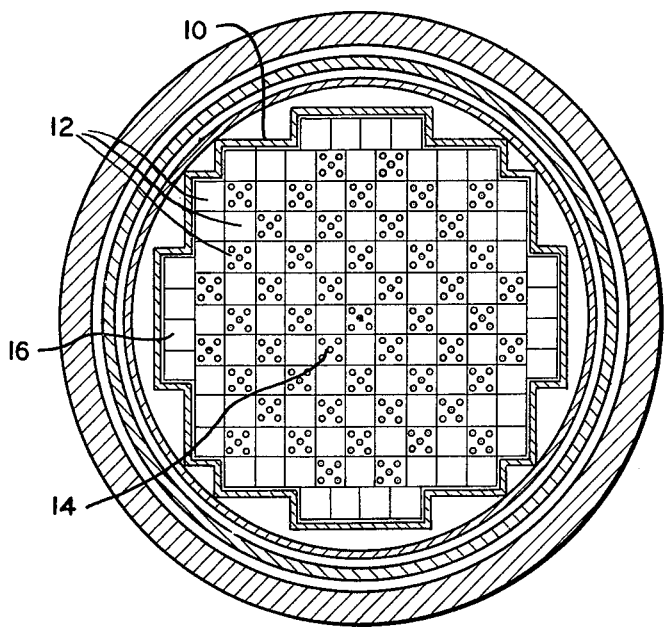
FIG. 3 is in the nature of a horizontal sectional view of a reactor core within which the organization of the present invention is utilized.

Referring now to the drawings wherein like reference numerals are used throughout to designate like elements, there is depicted in FIG. 3, somewhat diagrammatically, the interior of a nuclear reactor. In this illustration there is provided a core shroud 10, which may be of stainless steel, and within which is disposed the core of the reactor. This core comprises numerous fuel assemblies 12, each of which preferably is of the type having longitudinally extending fuel elements in spaced relation. Each assembly is removable from the core independently of the others with each assembly itself comprising a removable unit. Disposed about the core shroud is the usual shielding and vessel containment, and the arrangement is such that fluid flows through the core generally longitudinally of the fuel elements, as, for example, upwardly through the core from the lower end of the fuel assembly to the upper region thereof.

In accordance with the present invention, in the event that one of these fuel assemblies in the core becomes defective intermediate refueling operations such as to cause contamination of the coolant, the assembly is removed from the core and a plug is placed therein. If the assembly is in a region of the core located inwardly from the outermost core region, there will be a reshuffling of fuel within the core after removal of the defective assembly so that there will be provided a vacant fuel assembly spaced at the outermost region of the core. The particular way in which the fuel is reshuffled will depend upon the particular refueling scheme used for the reactor. This outermost vacant fuel assembly space will then have placed in it one of the core plugs of the invention. In a core having three zones identified as an inner zone, an outer zone, and a zone radially intermediate the inner and outer zones this procedure may be as follows. Assuming that the defective assembly is in the innermost region, this defective assembly will be removed and it may be replaced by one of the assemblies in the intermediate region. This assembly may, in turn, be replaced by one of the outermost assemblies in the outer region. This outermost assembly will, in turn, be replaced by the core plug of the present invention.

Figure 1:
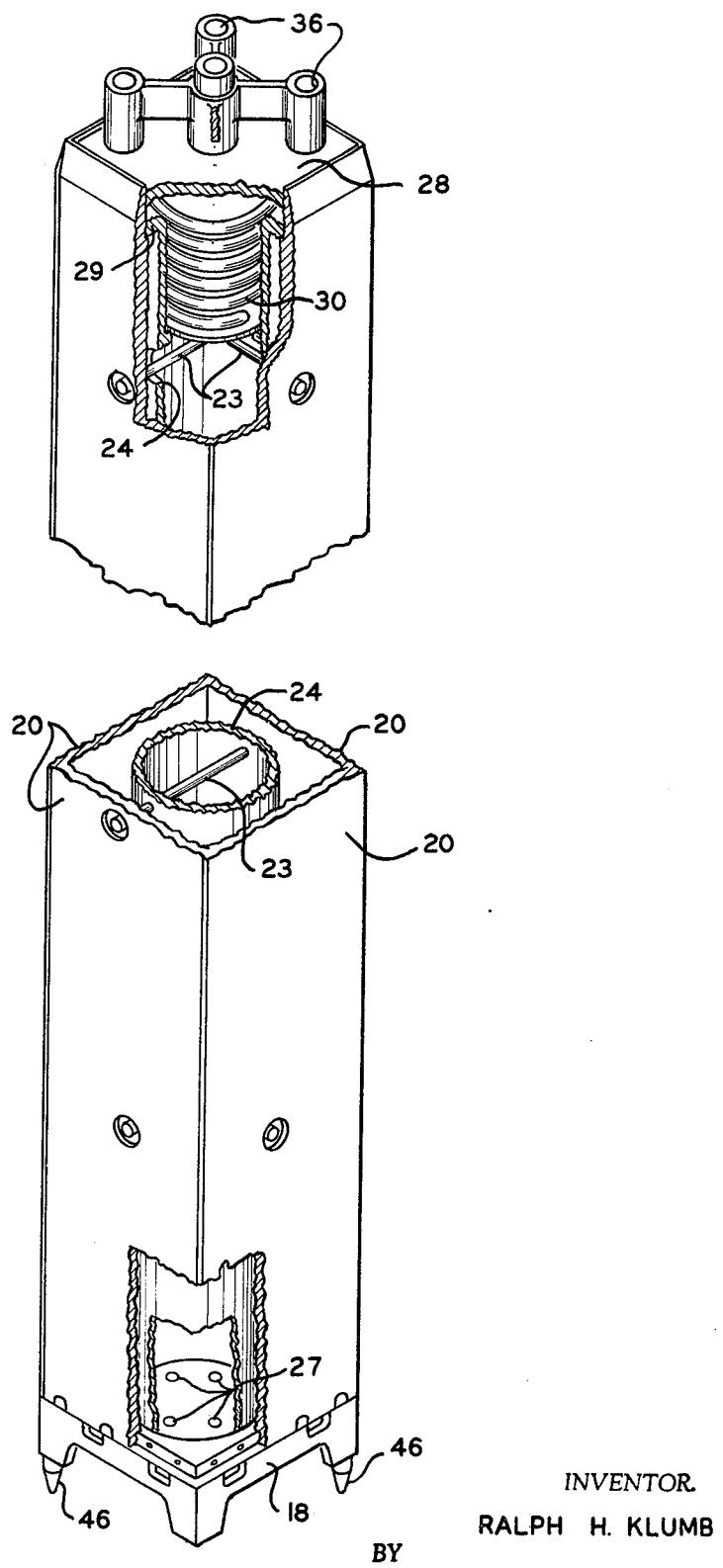
FIG. 1 is a perspective view partially broken away showing the core plug of the present invention.
Figure 2:
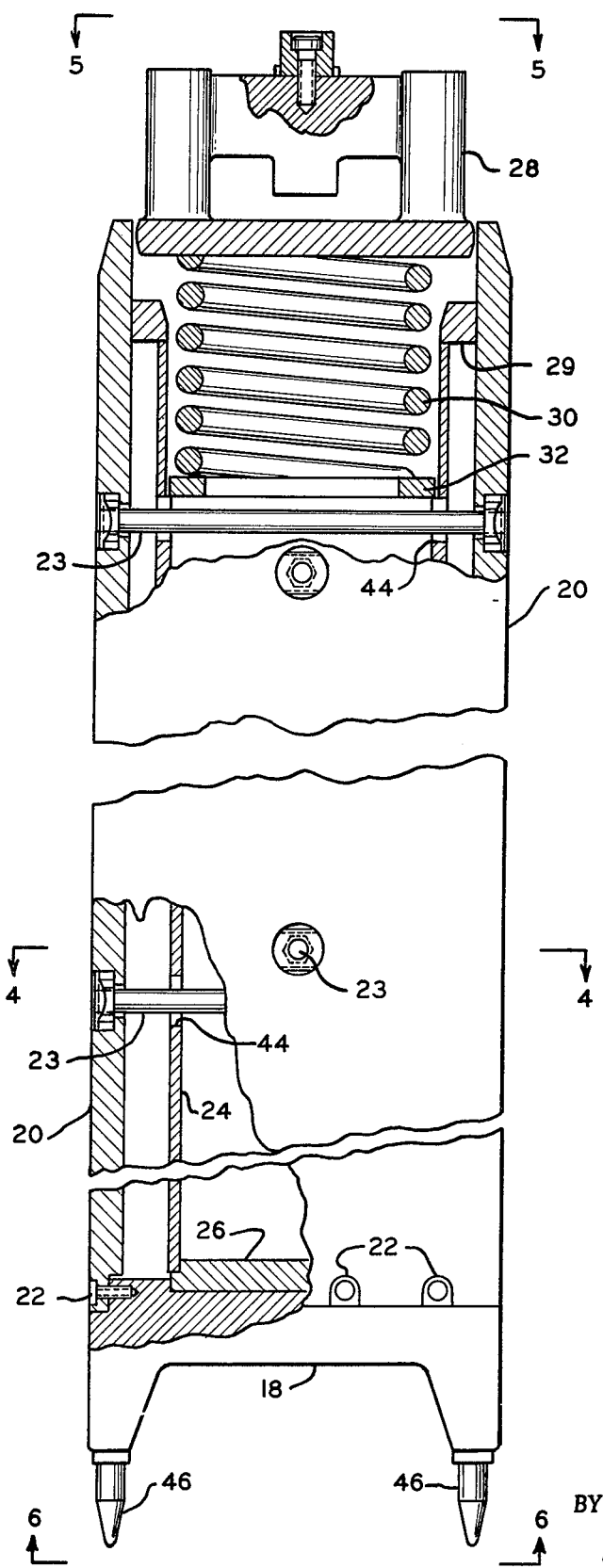
FIG. 2 is a vertical elevational view of this plug with portions of this view also being broken away to show details of the construction of the plug.
Figure 5:
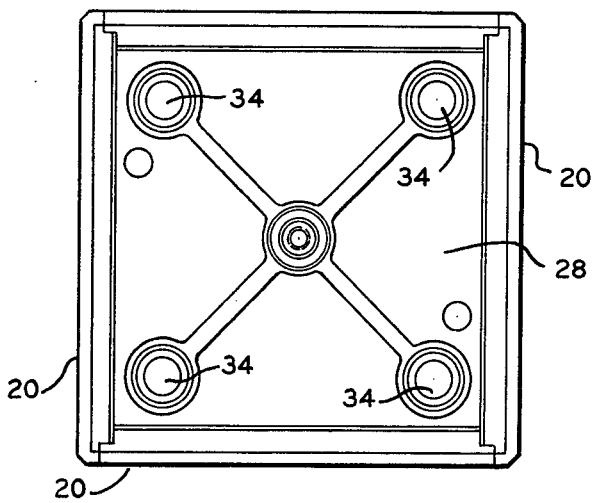
FIG. 5 is a top view of the plug taken generally from line 5—5 of FIG. 2.
Figure 4:
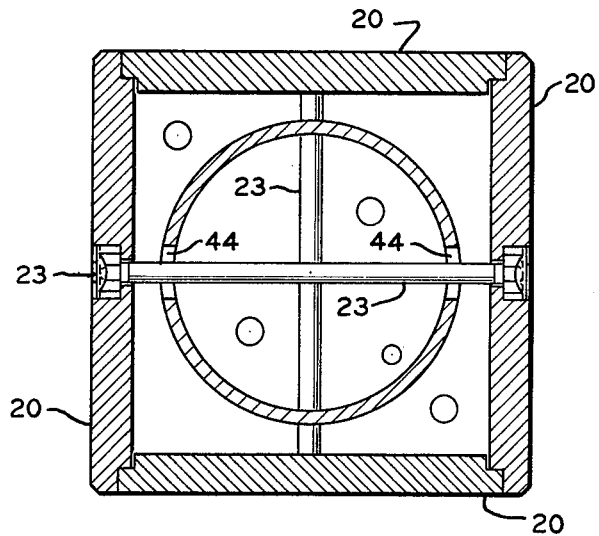
FIG. 4 is a sectional view of the plug taken generally along line 4—4 of FIG. 2.
Figure 6:
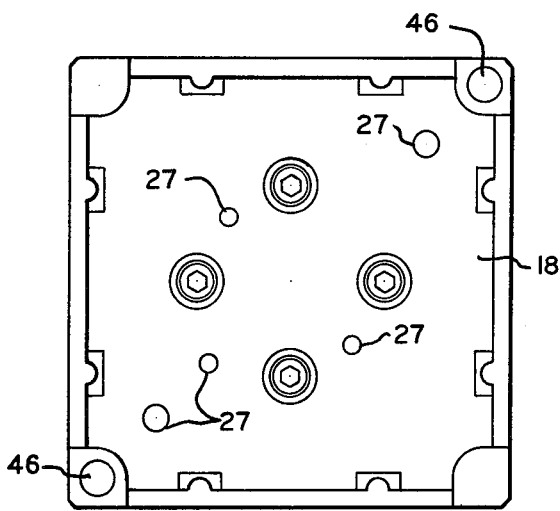
FIG. 6 is a bottom view of the plug taken generally from line 6—6 of FIG. 2.
Figure 7:
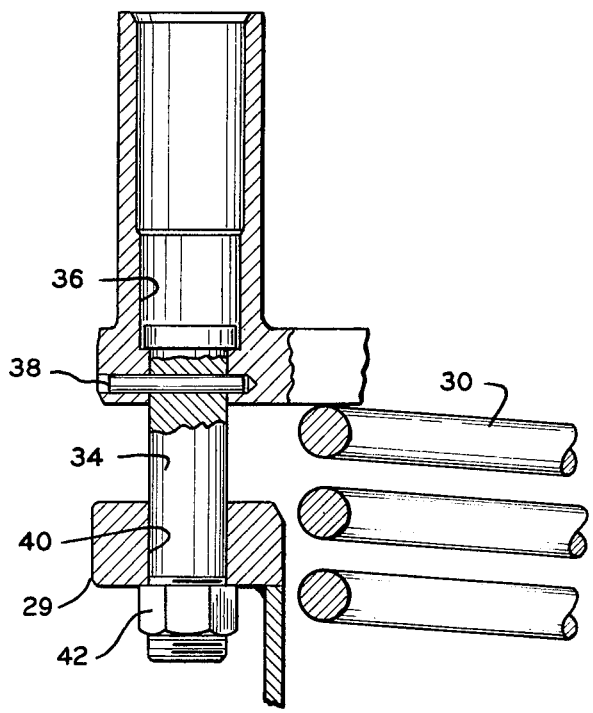
FIG. 7 is a detailed illustration of the interconnection of the upper end fitting with the support member of the plug.

As illustratively shown in the drawings, this plug comprises lower end fitting 18 which, as disclosed, is generally square in transverse section. Secured to this fitting are the side plates 20 with these plates being fixed to end fitting 18 by means of bolts 22. The plates 20 are interfitted at their edges as shown in FIGS. 4 and 5 with the plates being maintained in their proper relation by means of the interconnecting bolts 23 which extend between opposite side plates. The openings through which these bolts extend in the side plates are enlarged, and the disposition of the bolts is such as to permit longitudinal relative movement between the plates. This is necessary because during operation of the reactor these plates will become elevated in temperature due to gamma heating. However, they will not all be of the same temperature, and therefore differential expansion will occur and must be accommodated.

Disposed in the enclosure formed by the plates is the cylindrical support member 24. This member has secured to its lower end the plate 26 which rests in a recess provided in the end fitting 18. Both end fitting 18 and plate 26 are provided with openings 27 for the passage of fluid into the interior of the plug. The upper end of the cylindrical support is provided with flange 29 which conforms in cross section to the interior of the plates 20, i.e., in the illustrative embodiment is generally square.

At the upper end of the plug is the upper end fitting 28 and compressed between this fitting and cylindrical support 24 is spring 30. The lower end of the spring rests upon the annular member 32 which, in turn, rests upon a shoulder formed on the inner wall of cylindrical support 24. The spring 30 is precompressed by means of the bolts 34, with there being four such bolts, one in each of the corners of the upper end fitting 28. The bolts are received in openings 36 provided in the upper end fitting and held in place by means of pins 38. They extend through openings 40 provided in the flange 29 with nuts 42 being received on the lower end of the bolts.

Relative movement between the cylindrical support 24 and the side plates 20 is accommodated by having the openings 44 in the walls of the cylindrical support enlarged, as shown, to permit such movement as is required due to differential expansion.

When the plug is inserted in the core of the reactor, the pins 46 are placed in their complementary locating recesses in the lower core plate (not shown) with the upper end fitting being positioned against the hold-down plate (not shown) at the upper end of the core. Thus by precompressing the spring, the effective weight of the plug is increased to counteract the upward hydraulic force produced during operation of the reactor. By means of this preloaded spring, the differential thermal growth between the core plug and the core barrel and tolerance accumulations can be accommodated without reducing the hold-down load below a preset value. Since the effective weight of the plug is increased by the preloaded spring, the provision of this spring permits utilizing plates of reduced thickness (and consequently reduced core plug weight) thus limiting the gamma heating in the core components and still maintaining positive hold-down of the plug.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. An elongated core plug for a nuclear reactor, said plug being free of nuclear fuel and having a polygonal transverse section, the side wall members of the plug being in fixed relation at one end and free to expand relative to each other at the other end, said plug having upper and lower end plates with openings therein for restricted flow of fluid through said plug.

2. A core plug of claim 1 wherein a support member is disposed within said wall members and extending between the end fittings and spring means interposed between one of said end fittings and said support member, said spring being precompressed.

3. The core plug of claim 2 wherein said support member comprises a cylindrical member extending longitudinally of the plug and wherein the wall members are held in their respective operative relation by means of bolts extending intermediate opposed wall members and through said support member.

4. The core plug of claim 1 wherein the wall members are secured to one of the end fittings while the other end fitting is movable axially with relation to the wall members, a support member extending longitudinally of the plug and within said wall members, a spring interposed between said support member and said movable end plate and means operative to precompress said spring between these members, the end of the support member opposite the end adjacent said movable end fitting being in engagement with the other end fitting.

5. A core plug comprising in combination a lower perforate end fitting and a spaced axially aligned perforate upper end fitting, a support member extending between said fittings, the upper fitting and the upper end of said support member having a precompressed spring interposed therebetween, means for maintaining said spring in a precompressed condition, plate members disposed about said support member and fastened to the lower end fitting, bolts interconnecting opposed plate members in a manner permitting differential longitudinal movement between said plate members.

6. The core plug of claim 5 wherein the plug is of rectangular transverse section and the plate members are in engagement at the corners of the plug.

7. The core plug of claim 5 wherein the support member is provided at its upper end with an outwardly extending flange, bolt means extending from the upper end fitting through complementary openings in said flange, said bolt means being effective to maintain said spring precompressed.

* * * * *